No. 888,014. PATENTED MAY 19, 1908.
E. W. JOHNSON.
CATTLE STANCHION.
APPLICATION FILED DEC. 13, 1907.
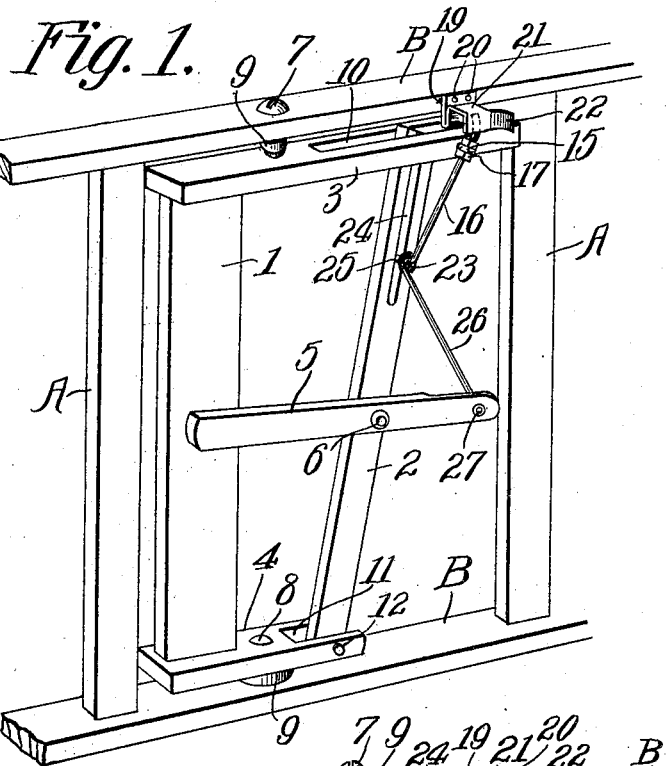
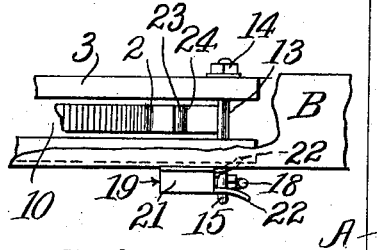
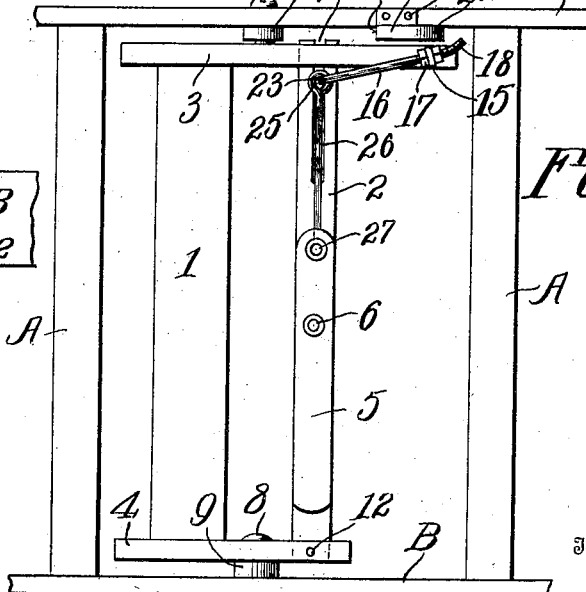
Witnesses:
Inventor,
Edward W. Johnson.
By C. A. Snow & Co.
Attorneys.

UNITED STATES PATENT OFFICE.

EDWARD W. JOHNSON, OF PORTVILLE, NEW YORK, ASSIGNOR OF ONE-HALF TO DAVID HEWIT LANGAN, OF GAINES, PENNSYLVANIA.

CATTLE-STANCHION.

No. 888,014.  Specification of Letters Patent.  Patented May 19, 1908.

Application filed December 13, 1907. Serial No. 406,341.

*To all whom it may concern:*

Be it known that I, EDWARD W. JOHNSON, a citizen of the United States, residing at Portville, in the county of Cattaraugus and State of New York, have invented a new and useful Cattle-Stanchion, of which the following is a specification.

This invention relates to cattle stanchions.

The object of the invention is to improve and simplify articles of this character, and to render them easier to operate by the animal and more positive in locking the animal against possibility of backward movement.

With the above and other objects in view, as will appear as the nature of the invention is better understood, the same consists in the novel construction and combination of parts of a cattle stanchion, as will be hereinafter fully described and claimed.

In the accompanying drawings, forming a part of this specification, and in which like characters of reference indicate corresponding parts, Figure 1 is a view in perspective of a cattle stanchion constructed in accordance with the present invention and showing the position occupied by the parts before the animal thrusts its head therethrough. Fig. 2 is a view in side elevation, showing the parts of the apparatus after the animal has thrust its head therethrough. Fig. 3 is a fragmentary detail plan view of a portion of the upper part of the stanchion.

Referring to the drawings, A—A designate two vertical beams and B—B two horizontal beams that may form a portion of the building in which the structure is located.

The stanchion comprises a stanchion post 1, a stanchion bar 2, an upper arm 3, a lower arm 4, and a trigger or lever 5 carried by the stanchion bar, and held pivotally connected therewith by a bolt 6. The upper and lower arms 3 and 4 are pivotally connected, for swinging movements in a horizontal plane, with the beams B, B by bolts or pintles 7 and 8, and in order to insure free swinging movements of the stanchion and to hold the arms 3 and 4 out of contact with the beams B, spacers 9 are interposed between the said beams and the stanchion arms, as clearly shown in Figs. 1 and 2.

The stanchion post 1 is rigidly connected with the arms 3 and 4, preferably by being mortised therein, although this is not essential, as the connection between the parts may be secured in any other way that will insure a stable assemblage.

The arms 3 and 4 are bifurcated or slotted, as shown at 10 and 11, these bifurcations extending inward towards the stanchion post 1 any preferred distance. The lower end of the stanchion bar is held for pivotal movements within the slot 11 by a bolt or rivet 12, and its upper end works in the slot 10, and is limited in its outward movements therein by a bolt or rod 13, one end of which carries a nut 14, and the other end of which is provided with an eye 15, the function of which will appear later on. The bolt 13 is loosely mounted in the arm 3 so as to be capable of free rotation.

As will be observed by reference to Fig. 1, the arm 3 is of greater length than the arm 4, and the slot 10 is of proportionately greater length than the slot 11, and this arrangement will permit the stanchion bar to occupy the requisite angular disposition relatively to the stanchion post when the parts are in the position shown in Fig. 1, thus to allow the animal to insert its head between the stanchion post and the stanchion bar, and when the stanchion bar has been shifted to the position shown in Fig. 2, it will occupy a position parallel with the stanchion post, and thereby contract the space between the parts to such an extent as to prevent withdrawal of its head.

The means for initially locking the stanchion against rotation, and for shifting the stanchion bar from the position shown in Fig. 1 to that shown in Fig. 2, consists of a combined latch and shifting lever 16 that is secured in the eye 15 of the bolt 13 by nuts 17 secured on the lever and bearing at opposite sides against the eye.

That part of the member 16 constituting the latch consists of a curved finger 18 that is designed to engage with a keeper, designated generally 19, that is secured by bolts 20 to the upper beam B. As shown in Fig. 1, this keeper consists of a channeled body portion 21, one end of which is provided with two outwardly flaring arms or guides 22, that will operate to direct the latch between the keeper, and thus lock the stanchion against pivotal movements when the trigger 5 is in the position shown in Fig. 1. That portion of the member 16 that constitutes the shifting lever embodies the entire length of the member from the eye 15 outward or downward, the free end of the lever being bent at right angles to its length to provide a finger 23 that is adapted to work in a longitudinal slot 24 formed in the upper end of the stanchion bar. The finger 23 is engaged by an eye 25 formed on one end of a link 26, the other end of which is bent at right angles to its length and projects through an orifice adjacent to one end of the trigger 5 and is held therein, against working out, by a washer or nut 27.

When the stanchion is set, as shown in Fig. 1, the animal will thrust its head in between the stanchion post and the stanchion bar above the trigger 5, and in so doing its throat will drag over the latter, thereby depressing it. It will be observed that the pivotal point of the trigger, with reference to the stanchion bar, is at such distance from the center as to cause that portion of the trigger that normally bridges the space between the stanchion bar and the stanchion post to be counterweighted, so that as soon as the animal has pushed the trigger down a sufficient distance to cause it to lie slightly below a horizontal plane, the weighted end will, by the force of gravity, drop, and thereby impart an upward movement to the link 26, which will cause the finger 23 to ride upward in the slot 24 of the stanchion bar, and thereby move the latter to the position shown in Fig. 2, and at the same time releases the latch 18 from the keeper 19, thus leaving the stanchion free to move pivotally on the pintles 7 and 8, so that the animal can readily reach the food provided for it. When the stanchion bar is in the position shown in Fig. 2, it will be held against yielding from lateral pressure, as from the animal's neck, by the member 16, which now occupies substantially a horizontal plane, so that any strain applied to the stanchion bar will be transmitted to the finger 23 and from it to the bolt 13, thereby securing the object sought.

To set the stanchion, and at the same time release the animal, it will only be necessary to swing the trigger upward until the stanchion bar passes a vertical line, whereupon it will drop to the angular position shown in Fig. 1, and hold the trigger in the position therein shown, and at the same time project the latch into the keeper 19.

It will be seen from the foregoing description, that although the improvements herein defined are simple in character, that they will be thoroughly efficient for the purposes designed and will coöperate in the production of a highly efficacious and durable structure.

I claim:—

1. The combination with a supporting frame, of a stanchion supported for pivotal movement thereby and comprising upper and lower arms, a stanchion post rigid with the arms, a stanchion bar pivotally connected with the lower arm, a trigger pivoted to the stanchion bar and designed to bridge the space between it and the stanchion post, and means actuated by the trigger to shift the position of the stanchion bar.

2. The combination with a supporting frame, of a stanchion pivotally supported thereby and comprising upper and lower arms, and a stanchion post rigid therewith, a stanchion bar pivotally connected with the lower arm, a trigger carried by the stanchion bar, a combined latch and shifting lever carried by the upper arm and being operatively connected with the stanchion bar, and a connection between the trigger and the said lever.

3. The combination with a supporting frame, of a stanchion supported for pivotal movement relatively thereto and comprising an upper and a lower arm and a stanchion bar rigidly connected therewith, one end of each of the arms being provided with a longitudinal slot, a stanchion bar having its lower end pivotally mounted in the slot of the lower arm and its upper end projected through the slot of the upper arm and provided with a longitudinal slot, a lever supported for pivotal movements by the upper arm and having its lower end bent to form a finger that projects through the slot of the stanchion bar, a counterweighted trigger pivoted to the stanchion bar, and a link connecting the lever and the trigger.

4. The combination with a supporting frame carrying a keeper, of a stanchion pivotally supported by the frame and comprising upper and lower longitudinally slotted arms and a stanchion post rigidly connecting the arms, a stanchion bar slotted at its upper end and projecting through the slot of the upper arm and having its lower end pivoted in the slot of the lower arm, a bolt carried by the upper arm and serving to limit the outward movement of the stanchion bar, a lever carried by the bolt and having portions to engage respectively with the keeper and with the slot of the stanchion bar, a trigger pivoted to the bar, and a link connecting the lever and the trigger.

In testimony that I claim the foregoing as my own, I have hereto affixed my signature in the presence of two witnesses.

EDWARD W. JOHNSON.

Witnesses:
E. C. NAGEL,
F. L. BARNES.